(12) United States Patent
Qiu et al.

(10) Patent No.: US 8,315,389 B2
(45) Date of Patent: Nov. 20, 2012

(54) GEOSECURITY METHODS AND DEVICES USING GEOTAGS DERIVED FROM NOISY LOCATION DATA FROM MULTIPLE SOURCES

(75) Inventors: Di Qiu, Menlo Park, CA (US); Sherman Lo, San Mateo, CA (US); David S. De Lorenzo, Palo Alto, CA (US); Dan Boneh, Palo Alto, CA (US); Per Enge, Mountain View, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 511 days.

(21) Appl. No.: 12/657,677

(22) Filed: Jan. 25, 2010

(65) Prior Publication Data

US 2011/0181470 A1      Jul. 28, 2011

(51) Int. Cl.
    *H04K 1/00* (2006.01)
(52) U.S. Cl. ...................................................... 380/258
(58) Field of Classification Search .................. 380/258
    See application file for complete search history.

(56) References Cited

U.S. PATENT DOCUMENTS

| | | | |
|---|---|---|---|
| 7,092,943 B2 | 8/2006 | Roese et al. | |
| 7,143,289 B2 | 11/2006 | Denning et al. | |
| 7,512,989 B2 * | 3/2009 | Scott | 726/30 |
| 2005/0105600 A1 * | 5/2005 | Culum et al. | 375/150 |
| 2007/0086593 A1 | 4/2007 | Denning et al. | |
| 2009/0316900 A1 | 12/2009 | Qiu et al. | |

OTHER PUBLICATIONS

Qiu, Di, "Security Analysis of Geoencryption: A Case Study Using Loran," Sep. 25-28, 2007, pp. 1146-1154, Proc. 20th Int'l Technical Meeting of the Satellite Division of the Institute of Navigation, ION GNSS 2007, Fort Worth, Texas.
Qiu, Di, et al., "Geoencryption Using Loran," Jan. 22-24, 2007, pp. 104-115, Proc. 2007 National Technical Meeting of the Institute of Navigation, ION NTM 2007, San Diego, California.
Juels, Ari, et al., "A fuzzy commitment scheme," 1999, pp. 28-36, Proc. 6th ACM Conf. on Computer and Communications Security, ACM, New York, NY, USA.
Dodis, Yevgeniy, et al., "Fuzzy Extractors: How to Generate Strong Keys from Biometrics and Other Noisy Data," 2004, pp. 523-540, Advances in Cryptology—Eurocrypt 2004, Springer Berlin / Heidelberg.

* cited by examiner

*Primary Examiner* — Yin-Chen Shaw
*Assistant Examiner* — Harris Wang
(74) *Attorney, Agent, or Firm* — Lumen Patent Firm

(57) ABSTRACT

In a geo-security system, a device receives RF signals from multiple distinct classes of RF communication systems and extracts location-dependent signal parameters. A current geotag is computed from the parameters by fuzzy extractors involving quantization of the parameters and Reed-Solomon decoding to provide a reproducible unique geotag. The current geotag is compared with a stored geotag, and a geo-secured function of the device is executed based on the result of the comparison. The use of multiple signal sources of different types, combined with special fuzzy extractors provides a robust geotag that allows both lower false rejection rate and lower false acceptance rate.

8 Claims, 4 Drawing Sheets

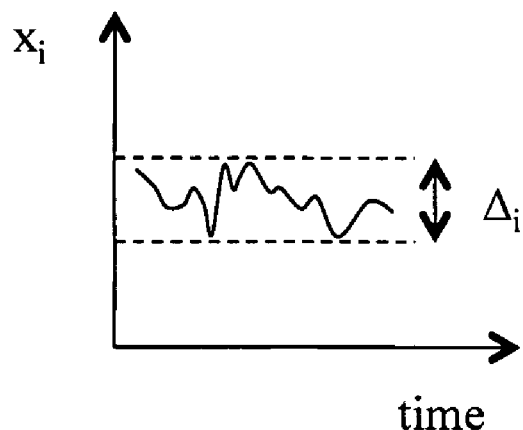
*Fig. 4*
*Fig. 5A*
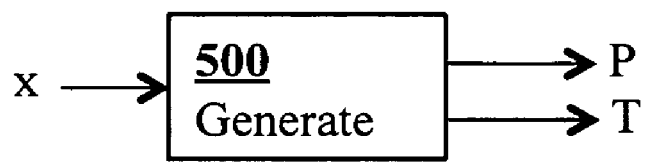
*Fig. 5B*
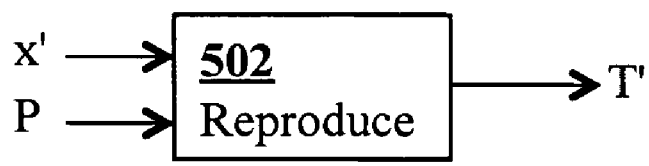

GEOSECURITY METHODS AND DEVICES USING GEOTAGS DERIVED FROM NOISY LOCATION DATA FROM MULTIPLE SOURCES

FIELD OF THE INVENTION

This invention relates generally to cryptography and computer security. More specifically, it relates to methods and systems for geosecurity.

BACKGROUND OF THE INVENTION

Conventional security techniques are typically based on one or more factors such as something you know (e.g., a password), something you have (e.g., a key card), and something you are (e.g., biometrics). Geosecurity provides another factor: somewhere you are. More specifically, geosecurity involves the use of spatiotemporal information such as geographical position (and possibly time as well) as a factor in authentication. One application of geosecurity is to grant access to sensitive data only at authorized locations within a facility. Geosecurity techniques can also be used for a variety of other applications including generating alarms if a device is taken out of a secure area (i.e., geofencing), location-based control of device functionality (e.g., digital manners policy), proof of position, and location-enhanced social networking.

An desired property of any geosecurity application is that it should reliably reproduce a to unique geotag from any given location. This is a practical challenge, however, because geotags are customarily derived from radiofrequency (RF) signals that may not be reliable or may have limited stability or location accuracy. For example, the signal transmitters may be temporarily out of service or the signals may experience unpredictable fluctuations due to noise or interference from environmental effects or other RF transmissions.

Another important property of many geosecurity solutions is the cryptographic security of the geographical location information. It is desirable in many applications that the geotag can be made public while preserving the privacy of the location information from which it is derived. For example, encrypted geotags can be generated from location-dependent parameters of RF signals using one-way functions. However, unpredictable fluctuations in the RF signals can potentially alter the location-dependent parameters, resulting in a different encrypted geotag for the same location. Without the ability to reproduce unique geotags, valid locations will not be reliably authenticated (i.e., false rejection). One approach to reduce false rejection is to expand the geographical security radius of the geotags. However, geotags with a larger geographical security radius will match a wider range of geographical positions, risking positive authentication at undesired locations (i.e., false acceptance). Accordingly, there is a need for improved geosecurity methods and devices that address these problems.

SUMMARY OF THE INVENTION

In one aspect, the present invention provides a method for geo-security implemented at a device that includes an RF receiver, computer processor and memory. The device receives RF communication signals transmitted from N multiple distinct classes of RF communication systems such as, for example, cellular communications, television communications, radio communications, terrestrial navigational, satellite navigational, satellite communication, wireless interne, bluetooth, and active RF identification systems. The use of multiple distinct signal sources helps reduce the false accept rate and geographic security radius. In some implementations, the device may cryptographically authenticate one or more of the RF communication signals to protect against RF signal spoofing. In addition, the device is preferably tamper-resistant to increase security.

The device extracts from the RF communication signals N signal parameters x' that are time-invariant and location-dependent. Examples of such signal parameters are time of arrival (TOA), time difference of arrival (TDOA), direction of arrival (DOA), angle of arrival (AOA), signal strength (SS), received signal strength (RSS), signal-to-noise ratio (SNR), bit error rate (BER), envelope to cycle difference (ECD) and code carrier divergence (CCD).

The device computes a current geotag T' from the signal parameters x' and a public identifier P associated with a geo-secured function of the device. The geotag is computed by quantizing the N signal parameters x' to produce N corresponding quantized signal parameters q', computing a vector c' from q' and P, and computing the geotag T from c' using Reed-Solomon decoding and a hash function. This method employs fuzzy extractors to provide a reproducible unique geotag and a low false rejection rate.

The device compares the current geotag T' with a stored geotag T, and the geo-secured function is executed based on the result of the comparison. For example, the geo-secured function may be executed if the current geotag T' matches the stored geotag T, or if the current geotag T' does not match the stored geotag T. The geo-secured function may be one of various device functions such as, for example, decrypting data stored on the device, enabling a device speaker, and transmitting an alarm signal.

BRIEF DESCRIPTION OF THE DRAWINGS

FIG. 4 is a graph illustrating the variability of a signal parameter $x_i$ within a range $\Delta_i$ as a function of time, according to an embodiment of the present invention.

FIGS. 5A and 5B show two essential operations of a fuzzy extractor, according to an embodiment of the present invention.

DETAILED DESCRIPTION

Figure 1:
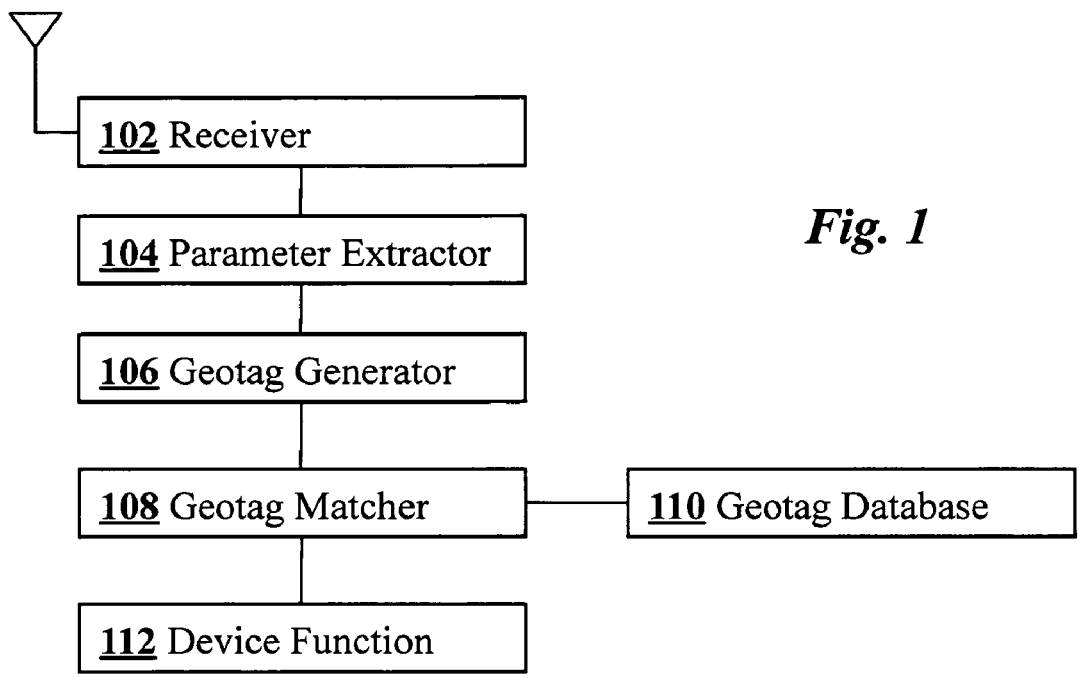
FIG. 1 is a block diagram illustrating components of a device according to an embodiment of the present invention.

FIG. 1 is a block diagram illustrating components of a geosecurity device according to an embodiment of the present invention. RF signals from multiple sources are detected by an antenna 100 connected to a receiver 102 which is capable of receiving multiple distinct types of RF signals. Parameter extractor 104 connected to receiver 102 analyzes the received signals and extracts location-dependent signal parameters which are then passed to geotag generator 106. Using the extracted location-dependent parameters, geotag generator 106 computes an encrypted geotag which is then compared at geotag matcher 108 with one or more stored geotags in geotag database 110. Depending on the results of the match, a geo-secured function 112 of the device may then be executed. The device is preferably tamper-resistant.

Although the term geotag is commonly used to describe any type of geographical metadata such as latitude and longitude associated with a piece of data such as a photograph, in the context of the present description, the term geotag is defined more specifically as encrypted data derived from location-dependent information using a cryptographic one-way function. The location-dependent information need not contain a description of geographical position such as geographical latitude and longitude coordinates, but need only contain parameters that depend on location such as the strength of RF signals received from particular transmitters, or other parameters.

To provide geotags with a smaller geographical security radius, i.e., higher spatial discrimination of geotags, embodiments of the present invention make use of geotags generated from signals received from a multiplicity of distinct types of sources. These source types include, for example, cellular communications, television and radio communications, terrestrial and satellite navigational, wireless internet, bluetooth, and active RF identification. Those skilled in the art will appreciate that these are merely examples and various other types of signal sources may also be used. If available, self-authenticated signals are desirable for many geo-security applications to help guard against signal spoofing.

Figure 2:
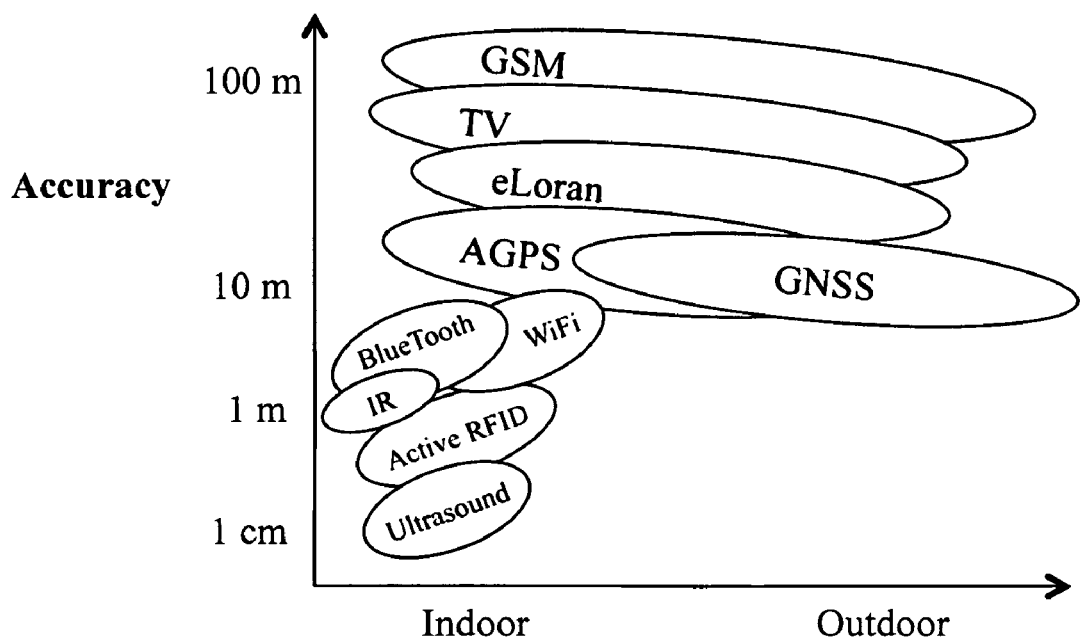
FIG. 2 is a graph illustrating the range and accuracy attributes of distinct RF signal source types, according to an embodiment of the present invention.
Figure 3:
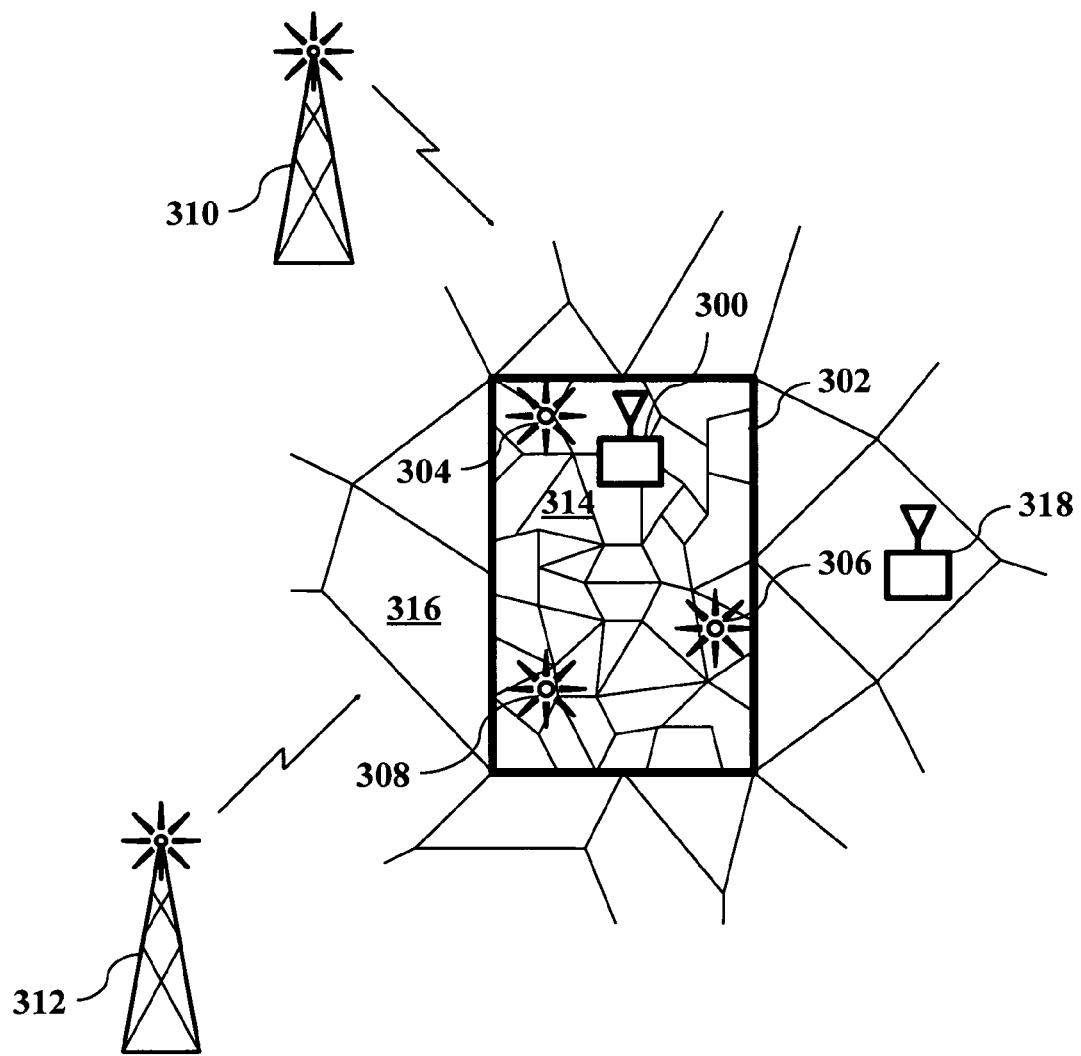
FIG. 3 is a schematic illustration of a geosecurity system using multiple sources to provide increased location-dependent information and smaller geosecurity radius, according to an embodiment of the present invention.

The use of multiple distinct signal source types increases the robustness and security of the geotags. For example, if information from one source type is unavailable, information from other sources may be used. Moreover, distinct source types often have complementary range and accuracy attributes, as illustrated in the graph of FIG. 2. The use of multiple sources also provides increased location-dependent information and thus higher spatial resolution and smaller geosecurity radius, as shown in FIG. 3. Device 300 is positioned within a building 302. Also positioned within the building are signal sources 304, 306, 308 of a first type, e.g., wireless internet access points. Outside the building are signal sources 310, 312 of a second type, e.g., cellular communications towers. RF signals from signal sources 304, 306, 308, 310, 312, as well as from possibly other signal sources (not shown) are received by the device 300. The polygonal regions in the figure represent distinct geosecurity regions that have corresponding unique geotags. As shown in the figure, the higher density of signal sources 304, 306, 308 within building 302 provides higher spatial correlation of location-dependent signal parameters and smaller security radius. For example, region 314 inside the building is smaller than region 316 outside the building. This small geosecurity radius means that it is less likely that an attacker 318 positioned near the building outside would be able to reproduce a geotag corresponding to a region inside the building. The location-based parameters may include, in addition to the received signal strength (RSS) of the signal from the wireless internet access point, its MAC address which uniquely identifies the access point.

Preferably, embodiments of the present invention generate geotags from four to six distinct signals and their corresponding location-dependent signal parameters. Location-dependent signal parameters include, for example, time of arrival (TOA), time difference of arrival (TDOA), direction of arrival (DOA), angle of arrival (AOA), signal strength (SS), received signal strength (RSS), signal-to-noise ratio (SNR), bit error rate (BER), envelope to cycle difference (ECD) and code carrier divergence (CCD). Those skilled in the art will appreciate that these are merely examples and various other location-dependent signal parameters may also be used.

The effective generation of encrypted geotags from location-dependent signals requires a technique for reliably reproducing a unique geotag from those signals, even when some of the signals are unavailable or altered by interference or other unpredictable time-dependent effects. This can be especially challenging when many signal sources are used because the more sources are used, the more likely one may be missing or altered by interference. Moreover, most cryptographic functions are designed to be sensitive to variations in the input, so that any unpredictable time-dependent alteration in just one of the signals would change the generated geotag, interfering with its reproducibility. For example, if a geotag is generated from the five signal sources 304, 306, 308, 310, 312, but one is later unavailable, the geotag would not be reproduced using conventional techniques.

To address these challenges, embodiments of the present invention generate robust geotags from multiple signals. In a preferred embodiment, the device receives RF communication signals transmitted from N multiple distinct classes of RF communication systems and extracts from the RF communication signals N signal parameters represented by a vector $x'=(x_1, x_2, \ldots, x_N)$. Preferably, each of the parameters $x_i$ is largely time-invariant and location-dependent. Unfortunately, in practice, the parameters may experience fluctuations due to unpredictable effects, or may be absent altogether. For example, FIG. 4 is a graph illustrating the variability of a signal parameter $x_i$ within a range $\Delta_i$ as a function of time. Because the variation of the signal parameter $x_i$ is largely contained within the range $\Delta_i$, a fuzzy extractor may be used to mitigate the effects of these variations, as will be described in detail below.

FIGS. 5A and 5B show two essential operations of a fuzzy extractor. FIG. 5A shows a generate function 500, which acts on a signal parameter x to produce public identifier P and encrypted geotag T. This function is used in a calibration phase in which a region is surveyed and values for P and T are generated and stored in a database. FIG. 5B shows a reproduce function 502, which acts on a candidate signal parameter x' and public identifier P to produce encrypted geotag T'. The functions 500 and 502 are defined so that T=T' if and only if $d(x,x')<\delta$, where $\delta$ is a predetermined threshold and d is a distance function. In other words, if the signal parameters x' are close enough to x, then the geotag T can be reproduced from P.

Figure 6:
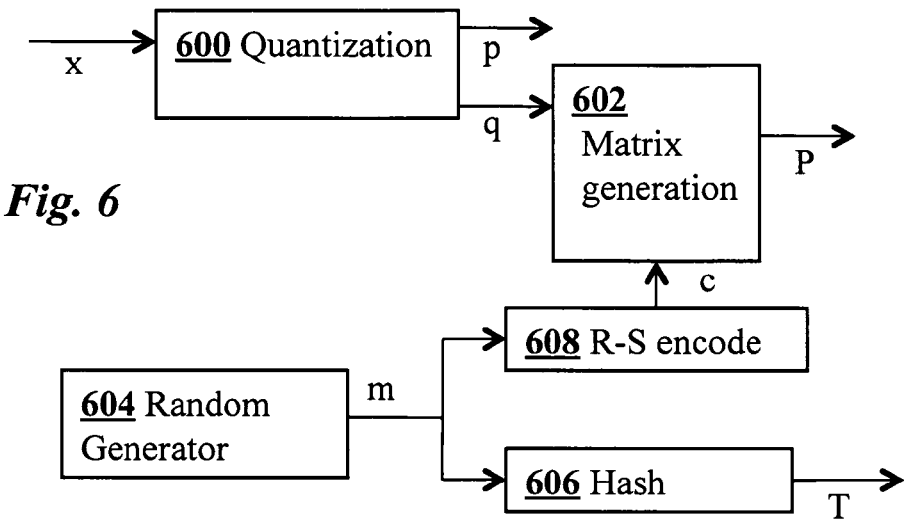
FIG. 6 is a functional block diagram illustrating the method for generating a public identifier P and geotag T from signal parameters x during a calibration of the system, according to an embodiment of the present invention.

FIG. 6 is a functional block diagram illustrating the method for generating P and T from signal parameters x during a calibration of the system. In block 600 the N continuous-valued components of x are each quantized to produce a corresponding discrete-valued vector $q=(q_1, q_2, \ldots, q_N)$. In block 602 the public identifier P is generated from q and a vector c, which is the result of encoding a message m. More specifically, random number generator block 604 generates a secret message m. From this message m, geotag T is produced in block 606 using a cryptographic hash function. In addition, message m is used to produce vector c in block 608 using an error-correcting code such as Reed-Solomon encoding. The public identifier P and geotag T may then be stored in a geotag database for later use in geosecurity verification. The calibration may be performed by the same device used for verification. Alternatively, the calibration may be performed by another similar device, and the geotag data transferred from the calibration device to the device performing the verification. Another alternative is for the verification device to transmit its current geotag to a central database where it is compared with the calibrated geotag data. The result of the calibration is to divide the geographical environment into two-dimensional cells, regions, or location elements (loxels). The size of the loxels depends on the repeatable accuracy (or precision) and spatial decorrelation of the location parameters. Using more location-based parameters can provide higher spatial discrimination and smaller cell size.

Figure 7:
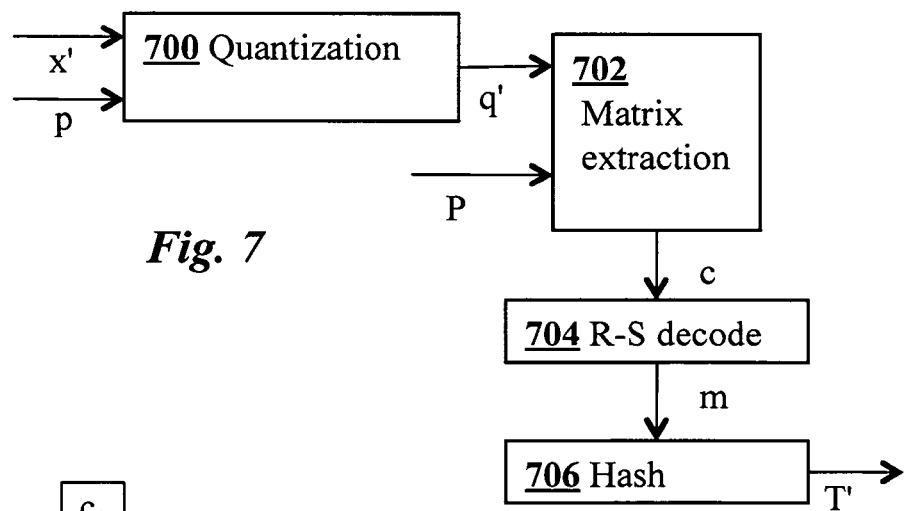
FIG. 7 is a functional block diagram illustrating a method for computing a current geotag T' from signal parameters x' and a public identifier P associated with a geo-secured function of the device, according to an embodiment of the present invention.

The functional block diagram of FIG. 7 shows an aspect of the verification phase in which the device computes a current geotag T' from the signal parameters x' and a public identifier P associated with a geo-secured function of the device. In block 700 the N signal parameters x' are quantized to produce N corresponding quantized signal parameters q', similar to block 600 of FIG. 6. In block 702 a vector c' is computed from q' and P. Using Reed-Solomon decoding in block 704, secret message m is calculated from c'. The geotag T' is calculated from m in block 706 using a hash function, just as in block 606 of FIG. 6. The use of fuzzy extractors here provides a reproducible unique geotag T and a low false rejection rate. A fuzzy extractor using a Euclidean distance in the quantization step reduces the adverse effects due to random noise and bias, quantization error, and offset adjustment. A fuzzy extractor using a Hamming distance and Reed-Solomon error correcting code handles the effects of missing signals. The distance metric d(x,x') in this case is the number of components in which x and x' differ. When both fuzzy extractors are used in combination, the public identifier P comprises both a vector p and a matrix P, as will be described below.

The quantization blocks 600 (FIG. 6) and 700 (FIG. 7) will now be described in more detail. The signal parameter vectors x may be regarded as elements of an N-dimensional metric space with distance function $$d(x, x') = \max_{i \in [i, N]} \frac{|x_i - x'_i|_\infty}{\Delta_i}$$

where the norm is the L-$\infty$ norm and $\Delta$ is a normalization vector or quantization step. The choice of $\Delta$ is a design parameter of the system. The larger the step, the more errors can be tolerated by the quantization fuzzy extractor. The quantization during calibration (i.e., block 600) may then be defined by $$q_i = \left\lfloor \frac{x_i}{\Delta_i} \right\rfloor$$

where the floor brackets represent the floor function, i.e., $q_i$ is the largest integer less than or equal to $x_i/\Delta_i$. A public quantization identifier vector p may be defined as the vector with components given by $p_i = x_i - \Delta_i q_i$. The quantization during verification (i.e., block 700) may be defined by $$q'_i = \left\lfloor \frac{x'_i - p_i}{\Delta_i} + \frac{1}{2} \right\rfloor$$

so that $q_i' = q_i$ if and only if $d(x_i, x_i') < \frac{1}{2}$.

Figure 8:
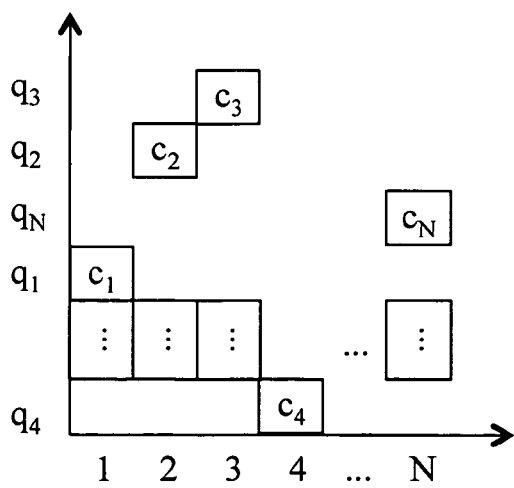
FIG. 8 is a schematic diagram illustrating how the components of a matrix P are related to the components of a code vector c and the discrete values of the quantized signal parameter q, according to an embodiment of the invention.

The matrix generation block 602 (FIG. 6) and matrix extraction block 702 (FIG. 7) will now be described in more detail in relation to FIG. 8. The public identifier P is represented as a matrix of size M×N where N is the number of signal parameters and M is the number of quantization levels of the parameters. The N components of the vector c are distributed among the N columns of P according to the discrete values of the components of q. In other words, the $q_i$ serve as indices so that $P(q_i, i) = c_i$. For example, if $q_i = 20$ then $c_i$ is positioned at row 20 of column i of matrix P. The other elements of the matrix P are populated with random integers between 0 and M−1. Thus, to generate P from q and c, the components of c are placed in P with positions specified by q, and the rest of the elements of P are filled with random integers. To extract c from P and q, the values of q are used to pick out the elements corresponding to the components of c, and the rest of the elements of P are ignored. Those skilled in the art will appreciate that this particular construction of P with its corresponding generation and extraction methods is just one of various possible techniques that may be used to similar effect. A key feature is that it is difficult for an attacker to guess c from P without knowledge of q.

The process of geosecurity verification is performed at the device at follows. The device compares the current geotag T' with a geotag T stored at the device. In alternate embodiments, the geotag T' may be sent to another device for comparison with stored geotag T. The geo-secured function at the device is then executed based on the result of the comparison between the two geotags. Specifically, the geo-secured function may be executed if the current geotag T matches the stored geotag T, or if the current geotag T' does not match the stored geotag T. The execution may also depend on various other conditions and device settings. For example, in a geo-secured data access application, a device function to access or decrypt stored data is executed only if the current geotag matches one or more stored geotags that were associated with authorized data access locations during a calibration process. A security-enabled storage device, for instance, can be programmed to work only while safely in an authorized data center. If the device is removed from the data center, sensitive data can not be read from it and bogus data can not be written onto it. In a geofencing security application, the geo-secured function may be, for example, transmitting an alarm signal if the current geotag does not match one of a set of stored geotags that were associated with authorized locations during a calibration process. In a digital manners policy application, the geosecured function may be the enabling or disabling of a device feature such as the audio speaker or ringer based on whether the current geotag matches one or more stored geotags. For example, a DMP-enabled cell phone can be programmed by the phone provider to turn off the camera while inside a hospital, a locker room, or a classified installation. Similarly, the phone can be programmed to switch to vibrate mode while inside a church, theater, concert hall, or lecture hall. In some embodiments, the signal parameters may include a timestamp which enables the geotag to control the device function based on time as well as location. For example, a DMP-enabled cell phone could be programmed to switch to vibrate mode in a specified location only during scheduled events.

The invention claimed is:

1. A method for geo-security comprising:
receiving at a device RF communication signals transmitted from N multiple distinct classes of RF communication systems;
extracting at the device from the RF communication signals N signal parameters x' that are time-invariant and location-dependent;
computing at the device a current geotag T from the signal parameters x' and a public identifier P associated with a geo-secured function of the device;
comparing at the device the current geotag T' with a stored geotag T;
and
executing at the device the geo-secured function based on the result of the comparison of the current geotag T' with the stored geotag T;
wherein computing the geotag from the signal parameters comprises:
quantizing the N signal parameters x' to produce N corresponding quantized signal parameters q';
computing a vector c' from q' and P; and
computing the geotag T from c' using Reed-Solomon decoding and a hash function.

2. The method of claim 1 further comprising cryptographically authenticating at least one of the RF communication signals.

3. The method of claim 1 wherein executing the geo-secured function based on the result of the comparison of the current geotag T' with the stored geotag T comprises executing the geo-secured function if the current geotag T' matches the stored geotag T.

4. The method of claim 1 wherein executing the geo-secured function based on the result of the comparison of the current geotag T' with the stored geotag T comprises executing the geo-secured function if the current geotag T' does not match the stored geotag T.

5. The method of claim 1 wherein each of the N multiple distinct classes of RF communication systems is a class selected from the group consisting of cellular communications, television communications, radio communications, terrestrial navigational, satellite navigational, satellite communication, wireless internet, bluetooth, and active RF identification.

6. The method of claim 1 wherein each of the N signal parameters x' comprises a signal parameter selected from the group consisting of time of arrival (TOA), time difference of arrival (TDOA), direction of arrival (DOA), angle of arrival (AOA), signal strength (SS), received signal strength (RSS), signal-to-noise ratio (SNR), bit error rate (BER), envelope to cycle difference (ECD) and code carrier divergence (CCD).

7. The method of claim 1 wherein the geo-secured function is a function selected from the group consisting of decrypting data stored on the device, enabling an audible ringer, and transmitting an alarm signal.

8. The method of claim 1 wherein $4 \leq N \leq 6$.

* * * * *